(No Model.)
C. S. HENSLEY.
ANIMAL TRAP.
No. 258,647. Patented May 30, 1882.
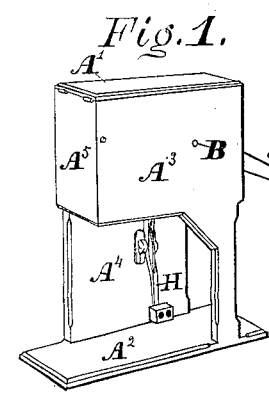
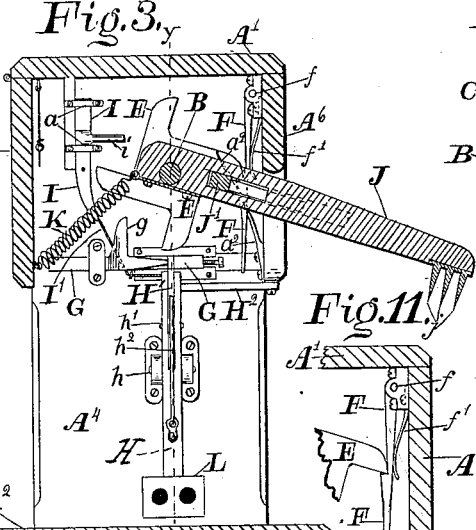
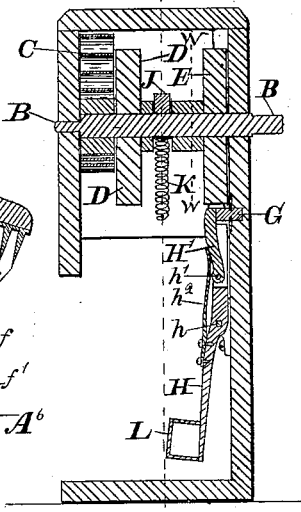
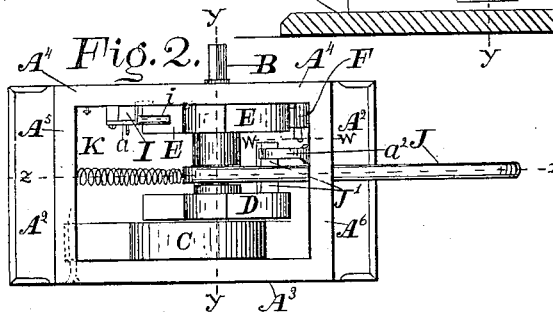
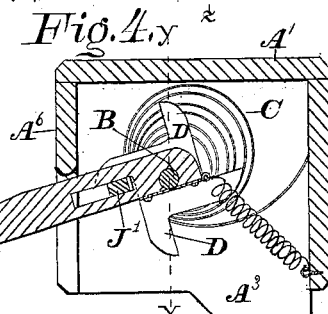
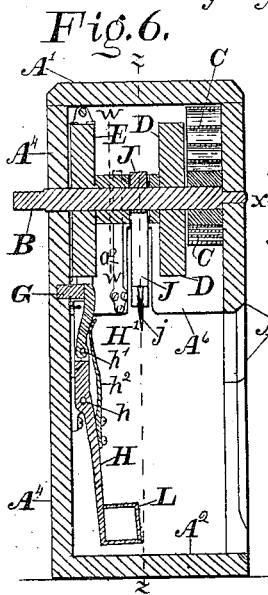
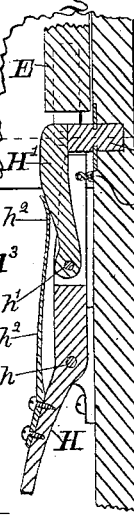
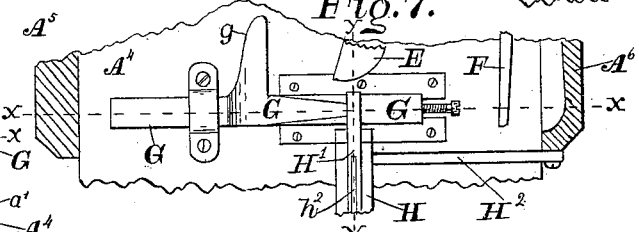
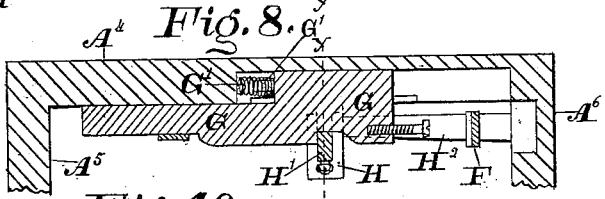
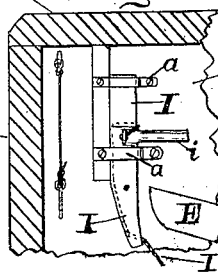
WITNESSES.
Chas. N. Leonard.
Chas. L. Thurber.
INVENTOR.
Chas. S. Hensley,
PER
C. Bradford.
ATTORNEY.
N. PETERS, Photo-Lithographer, Washington, D. C.

UNITED STATES PATENT OFFICE.

CHARLES S. HENSLEY, OF LAWRENCE, INDIANA.

ANIMAL-TRAP.

SPECIFICATION forming part of Letters Patent No. 258,647, dated May 30, 1882.

Application filed February 21, 1882. (No model.)

*To all whom it may concern:*

Be it known that I, CHARLES S. HENSLEY, of the town of Lawrence, county of Marion, and State of Indiana, have invented certain new and useful Improvements in Animal-Traps, of which the following is a specification.

My said invention relates to that class of traps which operate by striking and killing the animal instead of holding or confining it, and which operates automatically to reset itself, after being sprung, until the motive power has run down.

It consists in certain details of construction and arrangements of parts whereby accuracy and certainty of operation are secured, all as will be hereinafter specifically described and claimed.

Referring to the accompanying drawings, which are made a part hereof, and on which similar letters of reference indicate similar parts, Figure 1 is a perspective view of the trap in the form in which I prefer to construct it; Fig. 2, a top or plan view of the trap, the top or cover being removed; Fig. 3, a longitudinal vertical section, looking toward the rear side of the trap from the dotted lines $zz$; Fig. 4, a similar section on the same dotted lines, as seen when looking therefrom toward the front side of the trap; Fig. 5, a transverse vertical section, looking toward the front end of the trap from the dotted lines $yy$; Fig. 6, a similar section on the same dotted line, as seen when looking therefrom toward the rear end of the trap; Fig. 7, a front elevation of that portion of the mechanism which serves as the immediate means of springing the trap when the bait-lever is pressed against; Fig. 8, a horizontal section of the same on the dotted line $xx$; Fig. 9, a central vertical section of the bait-lever and its immediate attachments on the dotted line $yy$; Fig. 10, an elevation of a portion of the mechanism which resets the mechanism illustrated in Figs. 7 and 8, and Fig. 11 a detail view of the wheel E and detent F.

The terms "front side," "back side," "front end," and "back end," as used herein, will be readily understood from the following description.

Fig. 1, as will be noticed, is drawn on a small scale, Figs. 2, 3, 4, 5, 6, and 11 on a larger scale, and Figs. 7, 8, 9, and 10 on a still larger.

In said drawings, the portions marked $A'$ $A^2$ $A^3$ $A^4$ $A^5$ $A^6$ represent respectively the top, bottom, front side, rear side, front end, and rear end of the casing or frame of the trap, and the parts so lettered are to be understood as the parts referred to in the foregoing description of the drawings where said terms are used; B, the shaft on which the spring, ratchets, and striking-arm are mounted; C, the spring by which the mechanism of the trap is operated; D, a ratchet-wheel which engages with a sliding catch in the striking-arm; E, a ratchet-wheel which engages with a detent attached to the frame-work; F, said detent; G, a sliding bolt whereby said detent is operated to release the ratchet E; H, the bait-lever, which is adapted to hold said sliding bolt in position; I, a vertically-moving slide attached to said bait-lever, and adapted to draw it into engagement with the bolt G when the trap is being set; J, the striking-arm of the trap; K, a spring attached to the upper end of the same and to the frame, and L a bait-box.

The frame $A'$ $A^2$, &c., is of suitable form and size to support the mechanism of the trap so that the various parts shall be in proper relation to each other.

The shaft B runs transversely through the trap and carries the ratchet-wheels D E and the striking-arm J, and is driven by the spring C, or an equivalent weight. Said shaft is turned, in winding up the trap, by a crank-lever applied to one end.

The spring C is simply a common coiled spring, such as is used in clocks, &c. It is fastened at one end to the frame-work and at the other to the shaft, and when wound up drives said shaft around when permitted by the ratchet-and-catch mechanism.

The ratchet-wheel D is rigidly mounted on the shaft B, and engages with a sliding catch, $J'$, in the striking-arm J and drives said arm forward when the trap is sprung.

The ratchet-wheel E is rigidly mounted on the shaft B, and is enabled to hold said shaft from continual rotation by means of a detent which engages therewith. It also serves to force back the slides G and I during the partial rotation of the shaft which occurs during the operation of the trap mechanism.

The detent F is pivoted to the frame-work by a pivot, $f$, and is held forward into engagement with the ratchet-wheel E by a spring, $f'$. It is operated to temporarily release said engagement by the shuttle-like slides G and allow the wheel to revolve until another tooth thereon comes in contact with the projection on this detent.

The slide G is shuttle-like in its action. When the trap is set it is held in the position shown in the drawings (most plainly by Figs. 7 and 8) by the upper portion of the bait-lever H. When this is released this slide is operated by the spring G' to jump forward and strike the lower end of the detent F, forcing the same back and releasing the tooth of the ratchet-wheel held thereby from engagement, thus permitting said wheel to rotate until the next tooth thereof comes in contact with said detent. As said wheel revolves in this operation another tooth thereof engages with a projection, $g$, on this slide, forcing it back to its original position, where it is held by the bait-lever H until again released, as shown. This slide G moves on ways attached to the frame-work, and preferably projects partially into a groove cut therein.

The bait-lever H is secured to the frame-work by the pivot $h$, and vibrates thereon. It is constructed of two pieces, the upper one, H', being pivoted to the main portion (which is preferably bifurcated or grooved to receive it) by the pivot $h'$, and is held from falling outwardly by the spring $h^2$, which also imparts an elasticity to the movements of the said part and aids it to engage with the slide G promptly and certainly.

The slide I moves vertically alongside a projecting portion on the frame-work, being secured from falling from its position by loops $a$. It has a projection, $i$, with which the teeth of the ratchet-wheel E come in contact as said wheel revolves, and thereby raise said slide. This slide is connected to the upper end of the bait-lever H by a cord, I', which passes under an eye-pulley, $a'$, on the frame-work, whereby when said slide is raised the top end of said lever is drawn back into the position it occupies when the trap is set. This brings the part H' forcibly against the side of the slide G, and when said slide has been moved far enough springs into a notch or behind a projection on said slide, and thus holds it in place until said bait-lever is again pushed against at the lower end, and the trap thereby sprung. The top end of the bait-lever is enabled to resist the pressure of the slide G without being forced to one side by the arm H², which is pivoted thereto and to the frame-work.

The striking-arm J is simply a stout bar armed with sharp points $j$ on its striking end and mounted loosely upon the shaft B. It is slotted near its bearing on said shaft, and a catch, $j'$, in the form of a cross-bar, slides in said slot. Said cross-bar drops down when the arm J is thrown forcibly forward and frees said arm from engagement with the ratchet-wheel D, and permits it, when the force of its blow is spent, to be thrown back to position by the action of the spring K, which will be readily understood by an examination of the drawings. As this arm flies back said cross-bar comes in contact with the spring or incline $a^2$ on the frame-work, which forces it back to the top of the slot, where the next tooth of the wheel will engage therewith, and be thereby enabled to force the arm forward to make a blow when the trap is sprung.

The spring K is simply a common coiled spring or its equivalent, attached at one end to the upper end of the striking-arm and at the other to the frame-work, and which operates to hold said arm up in position to strike when not otherwise operated by the mechanism.

The bait-box L is a box of any construction, containing the bait, and having one or more small holes in its front side somewhat smaller than the animal's head, so that in endeavoring to reach the bait said animal will be likely to press forcibly against said box, and thus move the lever H and spring the trap.

The operation of my said invention may be recapitulated as follows: The animal, on entering the trap, endeavors to get at the bait in the box, which he does by attempting to insert his head in one of the holes in said box. In doing this he presses forcibly enough upon the lever H to throw the top end thereof out of engagement with the slide G, which, being released, is thrown forcibly forward, strikes the lower end of the detent F, forcing the same back out of engagement with the ratchet-wheel E, releasing the latter and permitting it and the shaft B to rotate, carrying with them the ratchet-wheel D and striking-arm J, the points $j$ on the latter of which hit and kill the animal. As the wheel E revolves another tooth thereon engages with the projections $g$ on the slide G, forcing said slide out of contact with the detent F, permitting it to return to its former place and engage with the next tooth of the wheel when it reaches it, and hold it until the trap is again sprung. Another tooth on said wheel E engages with the projection $i$ on the slide I, forcing said slide up, and through the cord I' pulling the bait-lever H back into engagement with the slide G, thus completing the resetting of the trap. These various operations are repeated each time the trap is sprung so long as the spring C has sufficient force left to drive the mechanism.

When the machine is to be wound up it is necessary to lift the slide I to the uppermost position which it reaches in the regular operation of the trap, and to push the striking-arm down so that the catch or cross-bar J' will drop down free of the ratchet-wheel D. A crank-lever is then applied to the shaft, which is thereby turned until the spring is wound up to the desired tension.

Having thus fully described my said inven- tion, what I claim as new, and desire to secure by Letters Patent, is—

1. The combination, in an animal-trap, of the bait-lever H, pivoted at h, the transversely-moving spring-actuated slide G, the detent F, the ratchet-wheel E, the shaft B, and the striking-arm, substantially as set forth.

2. The combination, in an animal-trap, of a spring-driven rotating shaft, a striking-arm loosely mounted thereon, but adapted to be driven thereby by a releasable catch mechanism, said catch mechanism, an intermittently-actuated ratchet-wheel on the said shaft, a detent for said wheel, and means for operating the same, substantially as set forth.

3. The combination, in an animal-trap, with the bait-lever thereto and a long-toothed ratchet-wheel on the shaft of the trap, of a slide, I, connected to said bait-lever by a cord, I', and adapted to be operated by said ratchet-wheel, whereby said bait-lever is returned to engagement with the springing mechanism, and the trap is thereby automatically reset, substantially as set forth.

4. The combination, with spring-slide G, of the bait-lever H, having pivoted catch part H' and spring $h^2$, whereby an elasticity is imparted to the catch part and a more certain engagement effected, substantially as set forth.

5. The combination, in an animal-trap, of a shaft, a loosely-mounted striking-arm thereon, and a rigidly-mounted ratchet-wheel on said shaft, said arm having a sliding catch, with which said wheel will engage and, when engaged and the trap mechanism is operated, force said arm forward, but which is adapted to slide down beyond the point of engagement, and thus permit said arm to return to its normal position, substantially as specified.

6. The combination, in an animal-trap, of the arm J, having sliding catch or cross-bar J' and an inclined spring, $a^2$, to force said catch to the upper end of its slide when said arm is raised, all substantially as set forth.

7. The combination, in an animal-trap, of the shaft B, striking-arm J, mechanism consisting of a spring, a ratchet, and a detent, and means for engaging and releasing the same for operating said striking-arm, and a spring, K, for forcing said arm back into position, substantially as set forth.

In witness whereof I have hereunto set my hand and seal, at Indianapolis, Indiana, this 17th day of February, A. D. 1882.

CHARLES S. HENSLEY. [L. S.]

In presence of—
C. BRADFORD,
CHAS. L. THURBER.